(12) United States Patent
Bremer et al.

(10) Patent No.: US 12,265,636 B2
(45) Date of Patent: Apr. 1, 2025

(54) CONDITIONAL ACCESS TO DATA

(71) Applicant: International Business Machines Corporation, Armonk, NY (US)

(72) Inventors: Lars Bremer, Boeblingen (DE); Albert Maier, Tuebingen (DE); Mike W. Grasselt, Leinfelden-Echterdingen (DE); Yannick Saillet, Stuttgart (DE); Michael Baessler, Bempflingen (DE)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 17/544,988

(22) Filed: Dec. 8, 2021

(65) Prior Publication Data

US 2023/0177193 A1 Jun. 8, 2023

(51) Int. Cl.
*G06F 21/62* (2013.01)

(52) U.S. Cl.
CPC .............................. *G06F 21/6218* (2013.01)

(58) Field of Classification Search
CPC ......... G06F 21/6218; G06F 2221/2141; G06F 21/6227; H04L 63/101
See application file for complete search history.

(56) References Cited

U.S. PATENT DOCUMENTS

| | | | |
|---|---|---|---|
| 9,621,357 B2 | 4/2017 | Williams | |
| 10,812,482 B1 | 10/2020 | Xu et al. | |
| 2002/0164021 A1* | 11/2002 | Sandru | G06Q 20/042 380/54 |
| 2004/0003072 A1 | 1/2004 | Mathew | |
| 2006/0149739 A1 | 7/2006 | Myers | |
| 2013/0275372 A1 | 10/2013 | Giustra et al. | |

(Continued)

FOREIGN PATENT DOCUMENTS

| | | |
|---|---|---|
| CN | 101714172 B | 3/2012 |
| CN | 103365946 A | 10/2013 |

(Continued)

OTHER PUBLICATIONS www.w3schools.com, sql_select, w3schools, May 7, 2021 (Year: 2021).*

(Continued)

*Primary Examiner* — Ajay M Bhatia
*Assistant Examiner* — Chongsuh Park
(74) *Attorney, Agent, or Firm* — James L. Olsen

(57) ABSTRACT

A database system can comprise records, each record including a set of attributes. The database system can further comprise database views, each database view representing a subset of the set of attributes. Data purpose objects indicating a subset of attributes of the set of attributes and a processing purpose can be stored. Each processing purpose can be associated with one or more entities that authorized access to the subset of attributes of the processing purpose. A request for data for a specific processing purpose and a selected view of the database views can be received. A data purpose object that indicates the specific processing purpose can be retrieved. The subset of attributes represented by the selected view can be compared with the subset of the attributes indicated in the retrieved data purpose object. Values of the subset of attributes of the selected view can be provided.

17 Claims, 8 Drawing Sheets

(56) References Cited

U.S. PATENT DOCUMENTS

| | | |
|---|---|---|
| 2015/0278314 A1 | 10/2015 | Fuglsang |
| 2018/0004813 A1* | 1/2018 | Smith .................. G06F 16/951 |
| 2018/0032747 A1 | 2/2018 | Whelan |
| 2018/0285589 A1* | 10/2018 | Jayaraman .......... G06F 21/6227 |
| 2019/0188312 A1 | 6/2019 | Pandit et al. |
| 2020/0364358 A1 | 11/2020 | Karia |
| 2020/0379994 A1 | 12/2020 | Rajaperumal et al. |
| 2021/0357373 A1* | 11/2021 | Vemulapalli .......... G06F 16/316 |

FOREIGN PATENT DOCUMENTS

| | | |
|---|---|---|
| CN | 113490928 A | 10/2021 |
| EP | 0952698 A2 | 10/1999 |
| JP | 2000112796 A | 4/2000 |
| TW | 202016754 A | 5/2020 |

OTHER PUBLICATIONS dwgeek.com, quick-best-way-compare-two-tables, dwgeek, Dec. 16, 2019 (Year: 2019).*

Mell et al., "The NIST Definition of Cloud Computing", NIST, National Institute of Standards and Technology, Special Publication 800-145, Sep. 2011, 7 pages.

International Searching Authority, "Notification of Transmittal of the International Search Report and the Written Opinion of the International Searching Authority, or Declaration," Patent Cooperation Treaty, Feb. 15, 2023, 12 pages, International Application No. PCT/EP2022/084609.

* cited by examiner

CONDITIONAL ACCESS TO DATA

BACKGROUND

The present disclosure relates generally to the field of computing, and in particular, to conditional access to data.

Privacy and data protection regulations are frequently emerging world-wide. These include, among others, General Data Protection Regulation (GDPR) and California Consumer Privacy Act (CCPA). These regulations often deal with the concept of consent. Consent in this context can relate to whether a person whose personal data is processed agrees to their data being processed in a certain way.

SUMMARY

Embodiments of the present disclosure are directed to a method for conditional access to data of a database system, the database system comprising records, each record including a set of attributes. The database system can further comprise database views, each database view representing a subset of the set of attributes. The method comprises storing data purpose objects, each data purpose object indicating a subset of attributes of the set of attributes and a processing purpose for processing said subset of attributes. The method further comprises associating each processing purpose with one or more entities that authorized access to the subset of attributes of said processing purpose. The method further comprises receiving a request for data for a specific processing purpose and a selected view of the database views. The method further comprises retrieving a data purpose object that indicates the specific processing purpose. The method further comprises comparing the subset of attributes represented by the selected view with the subset of the attributes indicated in the retrieved data purpose object. The method further comprises providing, in response to determining that the subset of attributes represented by the selected view is a subset of the subset of the attributes indicated in the retrieved data purpose object, values of the subset of attributes represented in the selected view for entities that are associated with the specific processing purpose.

The above method advantageously only allows access to data conditionally (based on a processing purpose and selected view). For example, the above method ensures that the data purpose object is retrieved based on the specific processing purpose of the data. The method further ensures that the subset of attributes represented by the selected view is a subset of the subset of the attributes indicated in the retrieved data purpose object prior to providing values of the subset of attributes. This ensures that the view requested by the third party is within the constraints defined within the data purpose object (e.g., based on user consent).

Embodiments of the present disclosure also relate to a system comprising one or more processors and one or more computer-readable storage media collectively storing program instructions which, when executed by the one or more processors, are configured to cause the one or more processors to perform a method for conditional access to data of a database system, the database system comprising records, each record including a set of attributes. The database system can further comprise database views, each database view representing a subset of the set of attributes. The method comprises storing data purpose objects, each data purpose object indicating a subset of attributes of the set of attributes and a processing purpose for processing said subset of attributes. The method further comprises associating each processing purpose with one or more entities that authorized access to the subset of attributes of said processing purpose. The method further comprises receiving a request for data for a specific processing purpose and a selected view of the database views. The method further comprises retrieving a data purpose object that indicates the specific processing purpose. The method further comprises comparing the subset of attributes represented by the selected view with the subset of the attributes indicated in the retrieved data purpose object. The method further comprises providing, in response to determining that the subset of attributes represented by the selected view is a subset of the subset of the attributes indicated in the retrieved data purpose object, values of the subset of attributes represented in the selected view for entities that are associated with the specific processing purpose.

The above system advantageously only allows access to data conditionally (based on a processing purpose and selected view). For example, the above system ensures that the data purpose object is retrieved based on the specific processing purpose of the data. The system further ensures that the subset of attributes represented by the selected view is a subset of the subset of the attributes indicated in the retrieved data purpose object prior to providing values of the subset of attributes. This ensures that the view requested by the third party is within the constraints defined within the data purpose object (e.g., based on user consent).

Embodiments of the present disclosure also relate to a computer program product comprising one or more computer readable storage media, and program instructions collectively stored on the one or more computer readable storage media, the program instructions comprising instructions configured to cause one or more processors to perform a method for conditional access to data of a database system, the database system comprising records, each record including a set of attributes. The database system can further comprise database views, each database view representing a subset of the set of attributes. The method comprises storing data purpose objects, each data purpose object indicating a subset of attributes of the set of attributes and a processing purpose for processing said subset of attributes. The method further comprises associating each processing purpose with one or more entities that authorized access to the subset of attributes of said processing purpose. The method further comprises receiving a request for data for a specific processing purpose and a selected view of the database views. The method further comprises retrieving a data purpose object that indicates the specific processing purpose. The method further comprises comparing the subset of attributes represented by the selected view with the subset of the attributes indicated in the retrieved data purpose object. The method further comprises providing, in response to determining that the subset of attributes represented by the selected view is a subset of the subset of the attributes indicated in the retrieved data purpose object, values of the subset of attributes represented in the selected view for entities that are associated with the specific processing purpose.

The above computer program product advantageously only allows access to data conditionally (based on a processing purpose and selected view). For example, the above computer program product ensures that the data purpose object is retrieved based on the specific processing purpose of the data. The computer program product further ensures that the subset of attributes represented by the selected view is a subset of the subset of the attributes indicated in the retrieved data purpose object prior to providing values of the subset of attributes. This ensures that the view requested by the third party is within the constraints defined within the data purpose object (e.g., based on user consent).

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
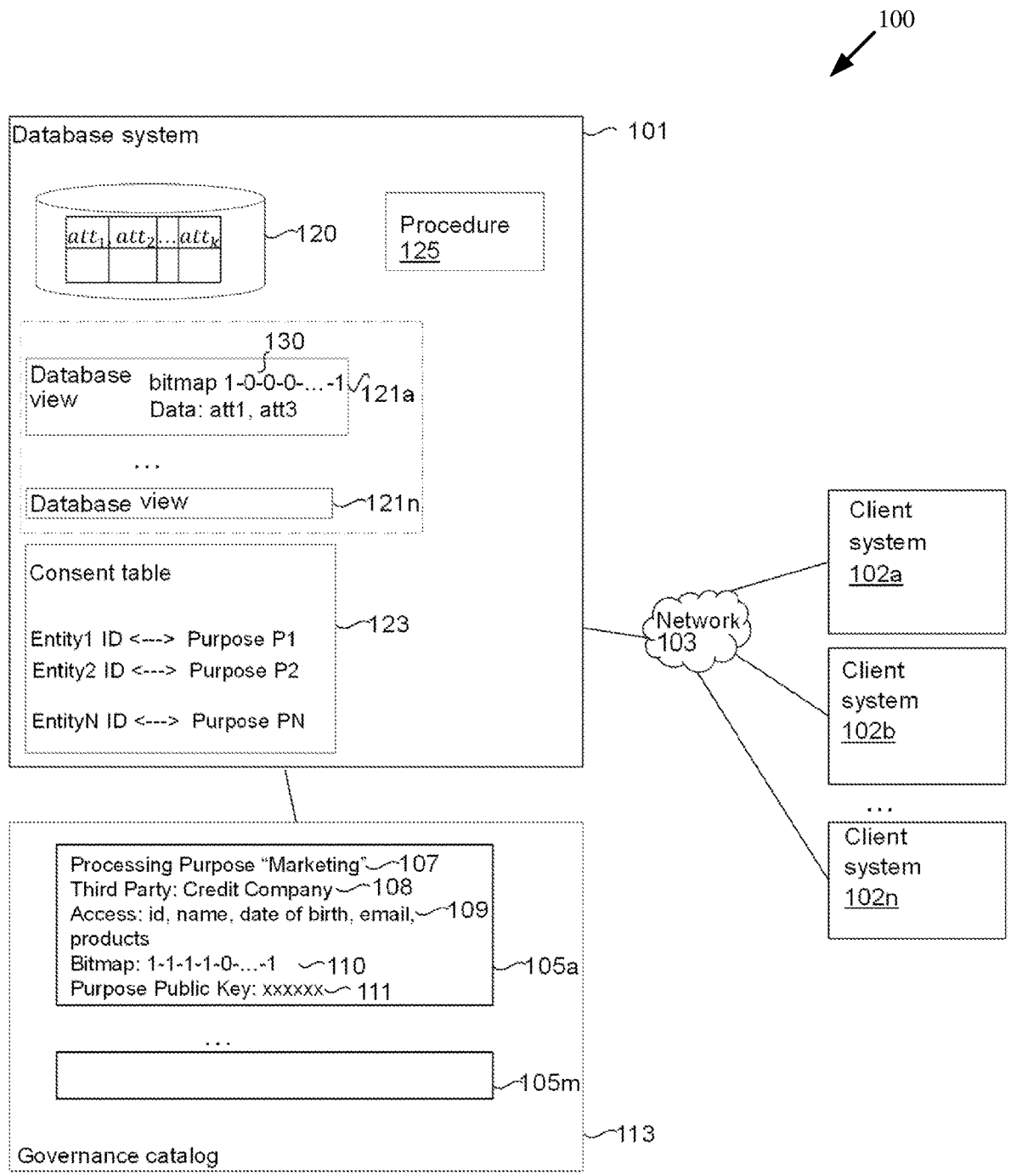
FIG. 1 is a block diagram of a computer system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to conditional access to data. While the present disclosure is not necessarily limited to such applications, various aspects of the disclosure may be appreciated through a discussion of various examples using this context.

Access to data is required to perform actions on data such as modifying data, deleting data, or using data for a certain processing purpose. There are advantages to sharing access to data (e.g., granting data access to one or more users). However, there are certain situations in which data sharing may be problematic (e.g., with medical data). This can be addressed by incorporating conditional access to data. By applying conditional access to data, certain criteria can be required to be met before granting access to the data (e.g., access to data may be granted subject to considerations such as consent policies and geographic restrictions). An entity may or may not authorize (e.g., consent) access to its data depending on the processing purpose and the requesting party. As an example, access to data for performing fraud analysis may require different access criteria as compared to access to data for marketing purposes. Setting criteria for conditional data access can vary based on the specific application and may be challenging to properly implement.

The present disclosure can enable sharing of data of database systems such as master data management (MDM) systems. The database system can include a database of records, each record having values of a set of attributes. The present disclosure may enable data subjects or entities to control the specific usage of their data (e.g., via consent from the user). This can be implemented by preventing access to records that a data entity does not consent to. The consent may be enforced on the database system level. Aspects of the present disclosure are more resilient to methods which only enforce consent on the application level. The consent may be enforced on the database level with very limited performance impact as it may make use of existing storage capabilities. Many third-party systems with individual data access requirements may be supported. The processing purposes of the third-parties may, for example, be defined in a governance catalogue and be ingested into the database system.

The present disclosure may incorporate criteria for conditional data access based on the third-party requiring access to data, the entities owning the data, and available resources of the database system. This can enable an automatic implementation of the conditional access to data of the database system. Information on the third parties and the associated authorizations may be collected. The third parties' related information may be stored as data purpose objects (e.g., in a business glossary or governance catalogue). A data purpose object refers to a data structure such as a file, array, tree, etc. Each data purpose object may comprise information that indicates a third-party system, a data processing purpose of the third-party system, and a subset of the set of attributes required for the data processing purpose. For example, the data purpose object may comprise a name of the processing purpose and a data structure such as a bitmap or list to represent the subset of attributes.

One or more data purpose objects may be associated with a third-party system. For example, data purpose objects can reference the specific data that is accessed and the reason for access by the third-party system. The information on the authorizations may be provided as an array of pairs of entities and corresponding data processing purposes (e.g., an entry of the array may comprise a user identification (ID) and processing purpose that the user has consented to). An entity may have a distinct and separate existence (e.g., a second entry within the database) and may have certain attributes which may be assigned values. For example, an employee or a company may be an entity. The possible attributes for an employee include name, date of birth, employee ID, etc. The entity can be represented by a record which may be the collection of the attribute values.

Using database views and the collected information, the database system may enable systematic conditional access to the data of the database for different third parties based on available resources of the database system. A database view may represent a result set of a stored query on the data which the database users can query just as they would in a persistent database collection object. Each database view of the database system may represent a respective subset of the data contained in the database. The database view may reference a subset of attributes of the set of attributes. For example, a view might externalize social media handles of a person.

In embodiments, the data purpose object comprises a first bitmap (e.g., configured to indicate the subset of attributes) that maps bits to the set of attributes respectively according to an order, wherein the database view comprises a second bitmap mapping bits to the set of attributes according to said order, wherein the second bitmap is configured to indicate the subset of attributes of the database view, and wherein the comparing is performed using the first and second bitmaps.

Each required attribute type may be mapped on the bitmap where each position in the bitmap corresponds to a type. The bitmap comprises a number of bits equal to the number of the set of attributes, where each bit represents a respective attribute. Each of the bits of the bitmap may be set to indicate whether the associated attribute is considered or not (e.g., a 0 can indicate it is not considered whereas a 1 can indicate it is considered). For example, if the set of attributes comprises address, date of birth and name, the bitmap may comprise three bits representing the three attributes following the order address→date of birth→name. Similarly, the bitmap of the database view may have the same number of bits following the same order of attribute representation. If the subset of attributes of the data purpose object comprises name and address, the bits of the bitmap may be set as 101 (e.g., the bits associated with the subset of attributes are set to 1 and the remaining bits are set to 0). The bitmap of the database view may be provided and set similarly so that a comparison between the bitmaps may be completed. If, for example, the subset of attributes of the database view comprises name, the bitmap may be set as 001.

By comparing the bitmaps of the purpose object and the required database view, the present method may determine whether the required view is covered by the purpose. Following the above example, by comparing 101 and 001 it may be determined that the database view is covered by the purpose (e.g., the subset of attributes address and name of the purpose cover the subset of attributes name of the database view). This may conserve computing resources as bitmaps occupy less storage space compared to other structures and enable comparisons on bit levels which may be faster (e.g., than comparing strings). For example, a new view can be created without mapping it to purposes, but merely by specifying the bitmap. Consent can be added or removed by adding/removing the consent to/from a consent table.

In embodiments, the data purpose object further comprises a public key. The received request further indicates a signature (e.g., a cryptographic digital signature). The method further comprises verifying the signature using the public key of the retrieved data purpose object, wherein the comparing is only performed if the signature is validated. Using the public key, the requesting third-party can authenticate the purpose by providing a signature encrypted with their private key.

The signature may, for example, be a digital signature such as a hash of a message. The signature may be encrypted with the third party's private key which is associated with the public key. In order to validate the digital signature, a hash of the same message may be calculated, the signature may be decrypted using the public key, and the resulting two hash values may be compared such that if they are the same, the signature may be validated.

In embodiments, associating each processing purpose of the processing purposes with one or more entities that authorized access to the subset of attributes of said processing purpose comprises: creating a consent table, wherein each entry of the consent table comprises an entity identifier (ID) of an entity and associated processing purpose, wherein providing values of the subset of attributes comprises joining the consent table with the selected view to only include the values of the subset of attributes for the entities that are associated with the specific processing purpose.

Following the above example, the consent table may include two entries referring to the data purpose object having the subset of attributes address and name. These two entries may be associated with two entity identifications (IDs) (e.g., user IDs). That is, the two entities have authorized or consented access to their names and addresses for the purpose indicated in the data purpose object. By joining the consent table and the selected view, the names of the two users having said user IDs may be provided.

In embodiments, the data purpose object comprises a first list comprising the subset of attributes, wherein the database view comprises a second list comprising the subset of attributes of the database view, wherein the comparing is performed using the first and second lists. The lists may be advantageous compared to the bitmaps for sparse data.

In embodiments, the method further comprises providing a procedure. The procedure is configured to receive, as input, the specific processing purpose and the selected view and to perform the retrieving, the comparing, and the providing steps; to execute the procedure via an application programming interface (API), wherein the reception of the request is performed via a function of the API that calls the procedure. Using a stored procedure for access to the database system can enforce consent and only allow third parties access to an individual's data for a given purpose if that individual consented to that purpose.

In embodiments, the method further comprises: receiving requests from third party systems for registering the processing purposes for the third-party systems and creating the data purpose objects, wherein each data purpose object further indicates the respective third-party system. For example, each data purpose object comprises a name of the third-party system. This third-party system's name may, for example, be the message used to generate the signature. This may be advantageous as both the third-party system and the database system have access to the same message that may be used for validation of signatures.

FIG. 1 illustrates a computer system 100 in accordance with embodiments of the present disclosure. The computer system 100 includes a database system 101 and one or more client systems 102*a-n* (also referred to as third-party systems 102*a-n*). The database system 101 can be configured to communicate with each of the client systems 102*a-n* via one or more networks 103. For simplification of the description, only one network is shown; however, the database system 101 may connect to the client systems 102*a-n* via more than one network (e.g., the database system 101 may connect to each of the computer systems 102*a-n* via a respective network). The network 103 may include, but is not limited to, a cable network, an optical fiber network, a hybrid fiber coax network, a wireless network (e.g., a Wi-Fi and/or mobile telephone network), a satellite network, the Internet, an intranet, a local area network, any other suitable network, and/or any combination of these networks.

The database system 101 may be remote to the client systems 102*a-n*, accessible over the network 103. The database system 101 may comprise a database 120 comprising values of a set of attributes $att_1, att_2 \ldots att_k$. The set of attributes represent an entity such as a person or company.

The database 120 may be associated with database views 121a-n. Each of the database views 121a-n may provide data of a respective subset of attributes of the set of attributes $att_1$, $att_2 \ldots att_k$. For simplification of the drawing, only one database view 121a is shown (though others may be structured similarly). The database view 121a comprises a bitmap or list 130 indicating the subset of attributes the data of which is provided by the database view 121a.

The database system 101 may provide conditional access to the database 120 by the client systems 102a-n using criteria. The criteria may be defined based on data processing purpose and authorizations or consents that are provided by the entities to access their data for the purposes.

The database system 101 may have access to a governance catalogue 113. Although shown as separate components, the database system 101 may, in another example, include the governance catalogue 113. The governance catalogue 113 may comprise data purpose objects 105a-m. For simplification of the drawing, only one data purpose object 105a is shown (though other data purpose objects can be structured similarly). The data purpose object 105a comprises information 108 indicating one of the third-party systems 102a-n. The data purpose object 105a comprises a name of a processing purpose 107 (the reason for access) for processing data of the database system 101. As shown in FIG. 1, the processing purpose 107 is defined as "marketing." The data purpose object 105a further comprises the subset of attributes 109 that may be used for the data processing purpose 107. The data purpose object 105a further comprises a bitmap or list 110 indicating the subset of attributes 109 and a public key 111 of the third-party system. One or multiple data purpose objects (e.g., data purpose objects 105a-m) may be stored for each third-party system 102a-n. Each purpose stored for a third party may use a bitmap for all types of data the purpose requires. For example, a marketing purpose can require access to an email address. The database system 101 includes a consent table 123. The consent table 123 stores the entity IDs (e.g., user IDs) that have consented to a purpose and the name of this purpose.

The database system 101 may further comprise a procedure 125. The procedure 125 may, for example, allow client systems 102a-n to retrieve data if the entity associated with the data consented to the access. To do so, the procedure 125 may retrieve the purpose from the governance catalogue 113 and verify the signature using the public key 111. Thereafter, the procedure 125 can allow access to the requested view if the data in the view is a subset of the data that was granted access to in the purpose. The stored procedure 125 can be implemented using existing features of databases such as an application programming interface (API), or can be built into the database as a query feature. Aspects may be advantageously used within database as a service (DBaaS) cloud technology.

Figure 2:
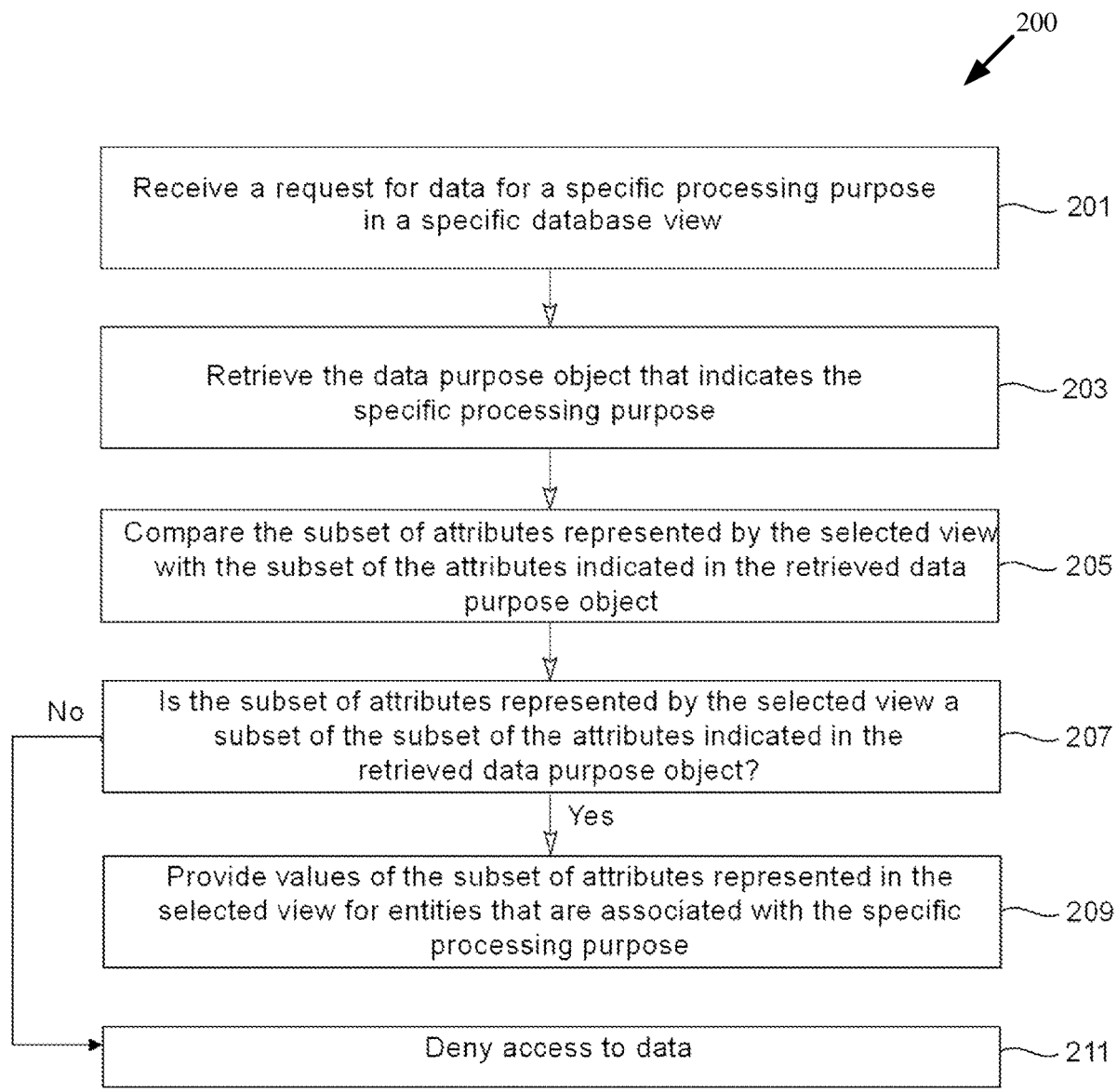
FIG. 2 is a flow-diagram of an example method for conditional access to data, in accordance with embodiments of the present disclosure.

FIG. 2 is a flow-diagram illustrating an example method 200 for conditional access to data, in accordance with some embodiments of the present disclosure. For the purpose of explanation, the method 200 may be described with respect to system 100 illustrated in FIG. 1. However, the method 200 is not limited to the system 100 illustrated in FIG. 1. The method 200 may, in embodiments, be performed by the database system 101.

Method 200 initiates at operation 201, where a request for data (e.g., of the database 120) is received. The request for data may be for a specific processing purpose (e.g., data processing purposes within data purpose objects 105a-m). The request may comprise a name of the specific processing purpose. The request may further indicate a selected view of the database views 121a-n. The view may, for example, be selected by the requestor or may randomly be selected (e.g., by the database system). Thus, the request indicates which data to access as indicated in the selected view and further indicates the purpose for which the data is accessed (e.g., the request comprises the name of the purpose). The request may, for example, be received as an API call of the stored procedure 125. Thus, the stored procedure 125 may be executed and the execution of the procedure 125 can include operations 203 to 211.

For simplification of the description, assume, as an example, that the database comprises data descriptive of products. The database may comprise a set of attributes such as product, client age, purchase date, number of purchased units, weight, size, etc. The database views may, for example, be two database views DV1 and DV2, wherein the database view DV1 has the subset of attributes product, client age and, purchase date and the database view DV2 has the subset of attributes weight, client age, and purchase date. The received request for data may be used to perform a statistical analysis to understand which age group is interested in which product. The received request may indicate one of the two database views DV1 and DV2.

Upon receiving the request, the database system 101 may retrieve, at operation 203, the data purpose object 105a-m that indicates the specific processing purpose. The name of the specific processing purpose may be compared with the processing purpose 107 entry that is stored in the data processing objects 105a-m and the data processing object that comprises said specific purpose name may be retrieved from the governance catalogue 113. In instances where the requested specific processing purpose is not stored (e.g., it is not part of the data processing objects 105a-m), the request may be rejected and thus the access to data may be denied.

The database system 101 compares, at operation 205, the subset of attributes represented by the selected view with the subset of the attributes indicated in the retrieved data purpose object. For example, the bitmap (list) 130 of the selected view may be compared with the bitmap (list) 110 of the retrieved data purpose object to determine whether the subset of attributes represented by the selected view is a subset of the subset of the attributes indicated in the retrieved data purpose object.

Following the above simplified example, the subset of attributes client age, purchase date, number of purchased units, and product of the retrieved data processing object that is associated with the request's specific purpose may be compared with the subset of attributes product, client age and purchase date of the database view DV1 (if the selected view is DV1) or be compared with the subset of attributes weight, client age and purchase date of the database view DV2 (if the selected view is DV2). If, for example, the selected view is DV2, then the check is unsuccessful because the subset of attributes weight, age and purchase date is not part of (only overlaps with) the subset of attributes of the retrieved data processing object. If, for example, the selected view is DV1, then the check is successful because the subset of attributes age, purchase date, and product is part of the subset of attributes of the retrieved data processing object.

If, at operation 207, a determination is made that the subset of attributes represented by the selected view is a subset of the subset of the attributes indicated in the retrieved data purpose object, values of the subset of attributes represented in the selected view for entities that are associated with the specific processing purpose are provided at operation 209. For example, each record of the database 120 may be processed to determine the entity associated with the record, and the determined entity may be compared with the entities listed in the consent table to check if the determined entity has authorized or consented to use its data for the received specific processing purpose, and if so, the values of the subset of attributes 109 of each record can be provided.

If, at operation 207, the subset of attributes represented by the selected view is not a subset of the subset of the attributes indicated in the retrieved data purpose object, access to data is denied (e.g., rejecting the request) at operation 211.

In embodiments, operations 201 to 211 can be automatically executed for each received request.

The aforementioned operations can be completed in any order and are not limited to those described. Additionally, some, all, or none of the aforementioned operations can be completed, while still remaining within the spirit and scope of the present disclosure.

Figure 3:
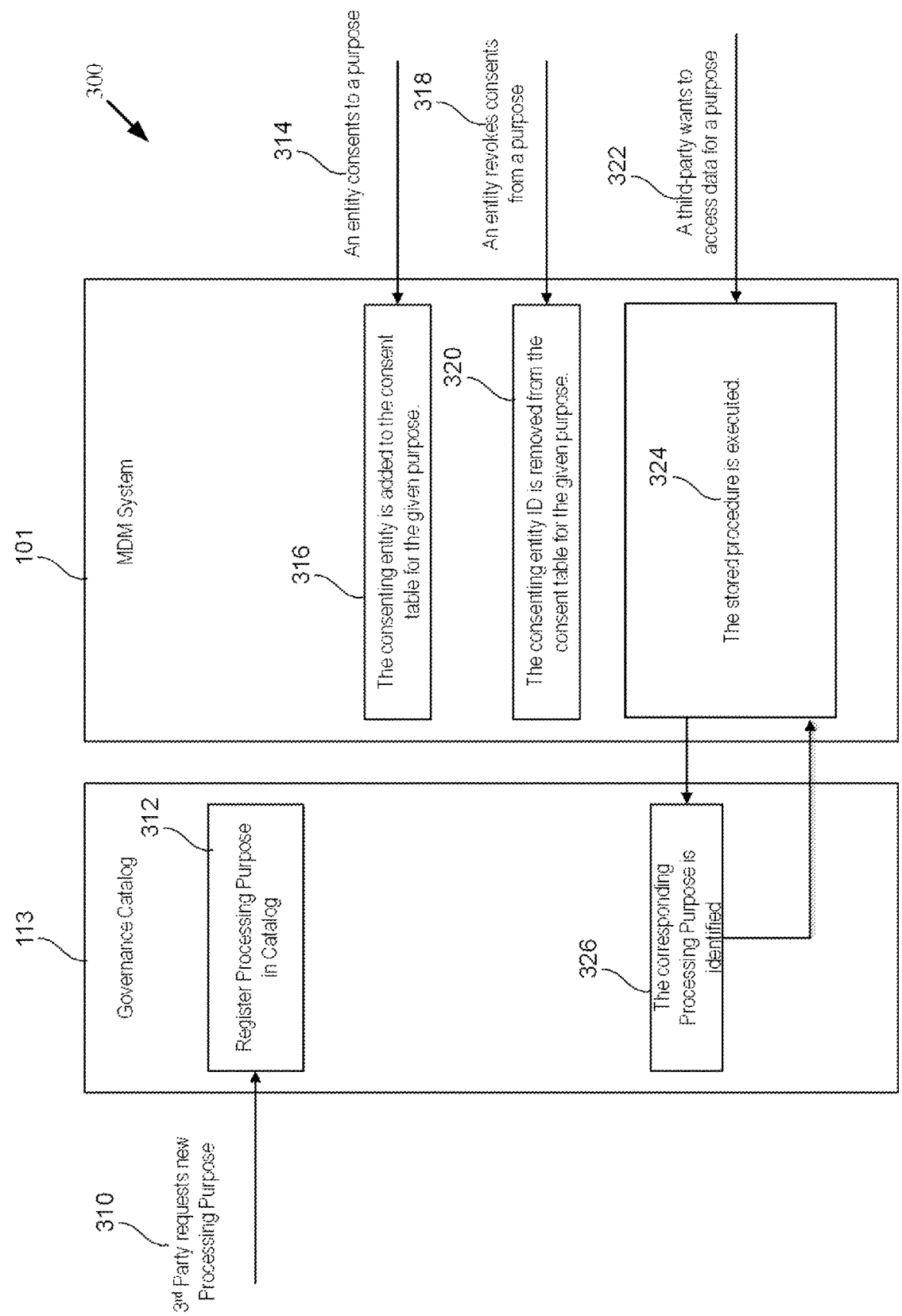
FIG. 3 is a diagram illustrating the collection of information regarding processing purposes and user consents, in accordance with embodiments of the present disclosure.

FIG. 3 is a diagram illustrating the collection of information regarding processing purposes and user consents, in accordance with embodiments of the present disclosure.

One or more third party systems may request (310) new processing purposes. In response to the request, the requested processing purposes may be stored in the governance catalogue 113 (e.g., as data purpose objects) (312). After storing the data purpose objects, an entity (e.g., a person or company) may consent (314) to a given purpose of the stored data purpose objects. The consenting entity may be added (316) to the consent table 123 for the given purpose. An entity may also revoke (318) consent from a purpose. For that, the consenting entity ID may be removed (320) from the consent table 123 for the given purpose. Operations 310 to 320 may enable transmission of information on purposes and consents that may be used by the database system 101 for conditional access to data. For example, a third-party system may request (322) to access data for a given purpose. In response, the stored procedure 125 may be executed (324). The execution of the stored procedure may comprise identifying (326) the stored data purpose object that corresponds to the given purpose.

Figure 4:
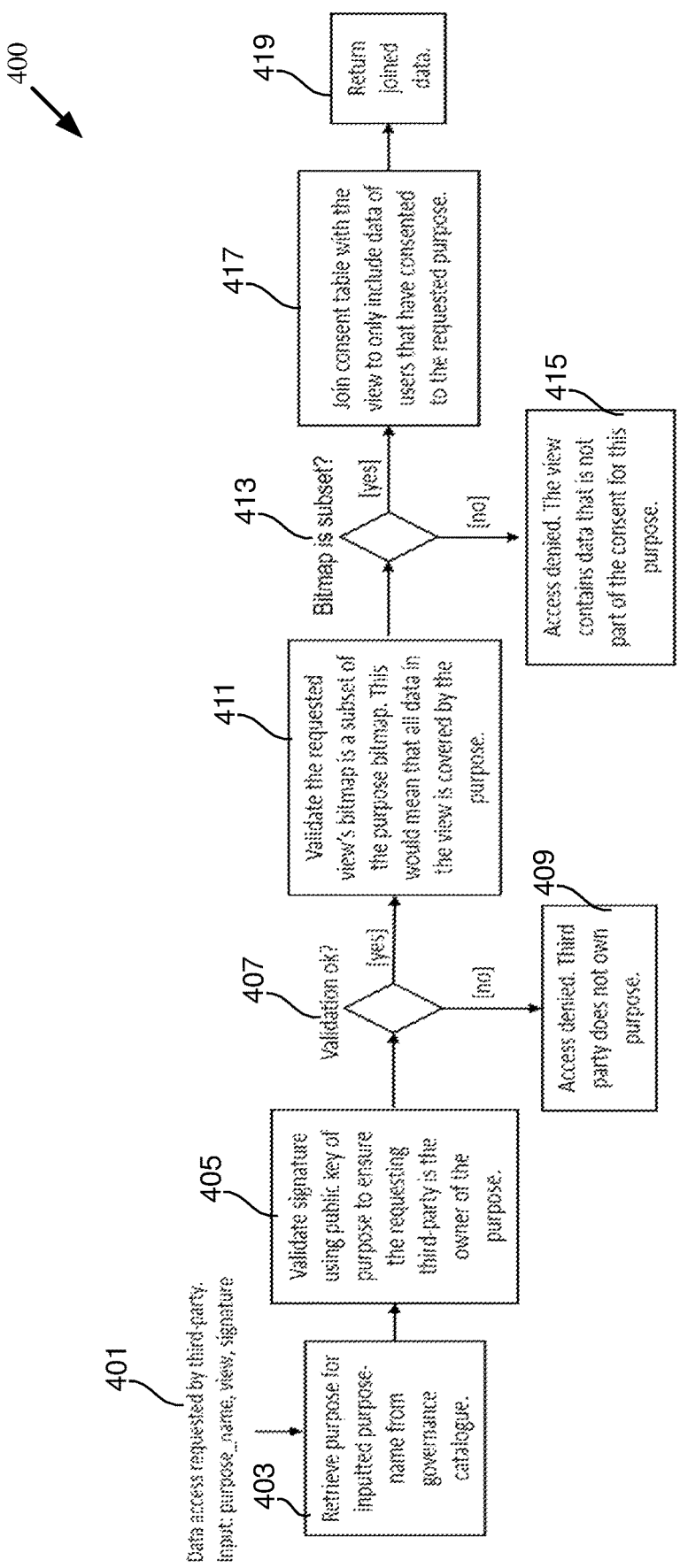
FIG. 4 is a flow-diagram of an example method for conditional access to data, in accordance with embodiments of the present disclosure.

FIG. 4 is a flow-diagram of an example method 400 for conditional access to data in accordance with embodiments of the present disclosure. For the purpose of explanation, the method 400 may be described with respect to system 100 illustrated in FIG. 1. However, the method 400 is not limited to the system 100 illustrated in FIG. 1. The method 400 may, in embodiments, be performed by the database system 101.

Method 400 initiates at operation 401, where a data access request by a third-party system is received. The request may comprise a purpose name, a database view 121a-n, and a signature. The database system 101 retrieves, at operation 403, a data purpose object 105a-m for the inputted purpose name from the governance catalogue 113.

The received signature is validated, at operation 405, using the public key of the retrieved data purpose object to ensure the requesting third-party is the owner of the data purpose object. If, at operation 407, the signature is not validated, the access is denied at operation 409 as the third party does not own the retrieved data purpose object.

If, at operation 407, the signature is validated, a determination is made, at operation 411, whether the requested view's bitmap 130 is a subset of the purpose bitmap 110. This indicates that all data in the view is covered by the purpose. If, at operation 413, it is determined that the requested view's bitmap 130 is not a subset of the purpose bitmap 110, the access is denied, at operation 415, because the view contains data that is not part of the consent for this purpose.

If, at operation 413, it is determined the requested view's bitmap 130 is a subset of the purpose bitmap 110, the consent table is joined, at operation 417, with the view to only include data of users that have consented to the requested purpose. The joined data is then returned (e.g., presented on a graphical user interface (GUI)). This is illustrated at operation 419.

Figure 5A:
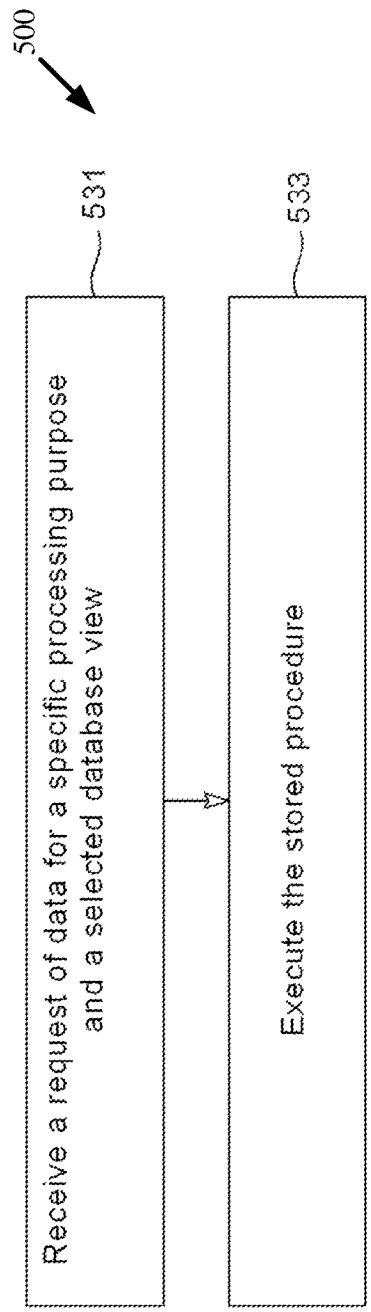
FIG. 5A is a flow-diagram of an example method for conditional access to data, in accordance with embodiments of the present disclosure.

FIG. 5A is a flow-diagram illustrating an example method 500 for conditional access to data, in accordance with embodiments of the present disclosure. For the purpose of explanation, the method 500 described in FIG. 5A may be implemented in the system illustrated in FIG. 5B.

Figure 5B:
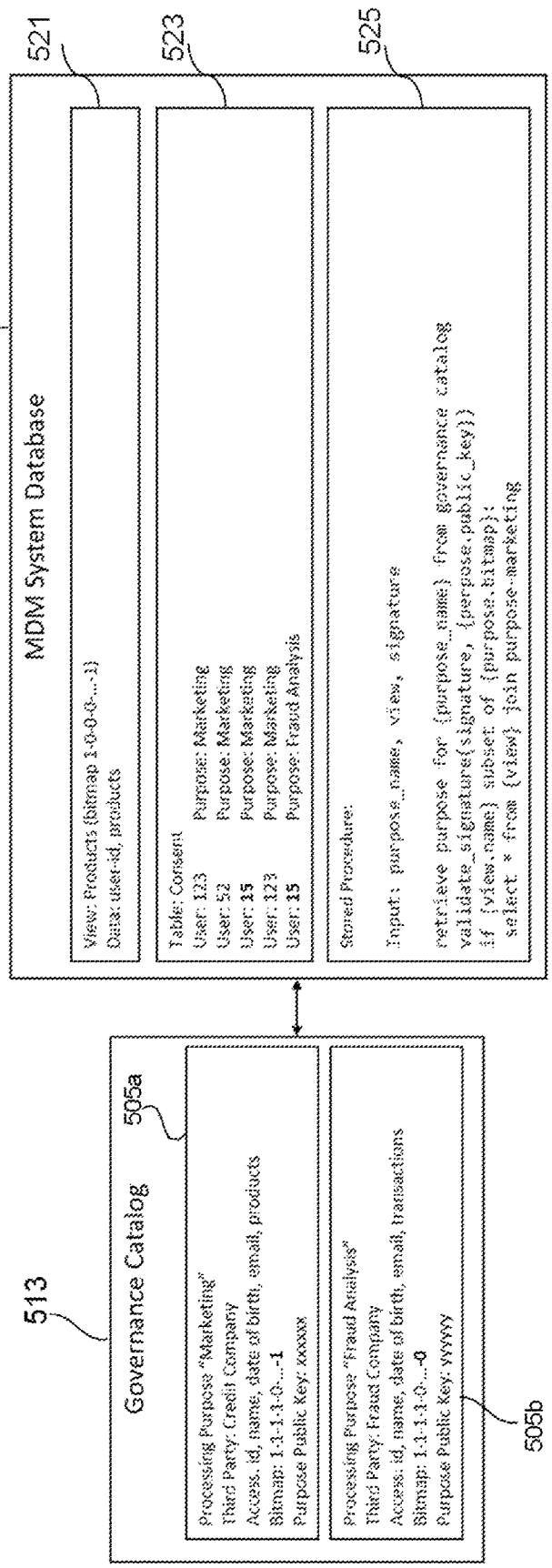
FIG. 5B is a diagram illustrating a database system and governance catalogue, in accordance with embodiments of the present disclosure.

FIG. 5B shows an example database system 501 and governance catalogue 513. The governance catalogue 513 stores two data purpose objects 505a and 505b. The data purpose object 505a represents the purpose named "Marketing" and the data purpose object 505b represents the purpose named "Fraud analysis". Each of the data purpose objects 505a and 505b can include information as described with reference to the data purpose objects of FIG. 1.

The database system 501 comprises database view 521, a consent table 523, and a stored procedure 525. A request to access data is received, at operation 531 of method 500, by the database system 501. The request comprises the list of inputs required by the stored procedure 525 which are the purpose name, the selected view, and the signature. In response, the database system 501 executes, at operation 533 of method 500, the stored procedure 525 using the inputs. The execution of the procedure 525 may, for example, perform operations 203 to 211 of FIG. 2 for enabling or denying access to the requested data. As indicated by the exemplary pseudocode of FIG. 5B, the procedure may retrieve the purpose from the governance catalogue 513 and verify the signature using the public key. Thereafter, it allows access to the requested view if the data in the view is a subset of the data that was granted access to in the purpose.

As an example, for marketing purposes, a Credit-Company may request data from the database system 101 to understand what products "Jane Doe" user-id "15" has purchased. The database system 101 may allow this request because the accessed views bitmap is a subset of the access that was granted by Jane to the Credit-Company for the given purpose.

In another example, for marketing purposes, a Fraud-Company may request data from the database system 101 to understand what products "Jane Doe" user-id "15" has purchased. The database system 101 may not allow this request because there is no purpose "marketing" for this company.

In another example, for marketing purposes, a Credit-Company may request data from the database system 101 to understand what products "John Doe" user-id "16" has purchased. The database system 101 may not allow this request because the user 16 (John) has not granted consent for the data access.

In another example, for fraud analysis purposes, a Fraud-Company may request data from the database system 101 to understand what products "Jane Doe" user-id "15" has purchased. The database system 101 may not allow this request because the products view's bitmap is not a subset of the "Fraud Analysis" purpose.

Figure 6:
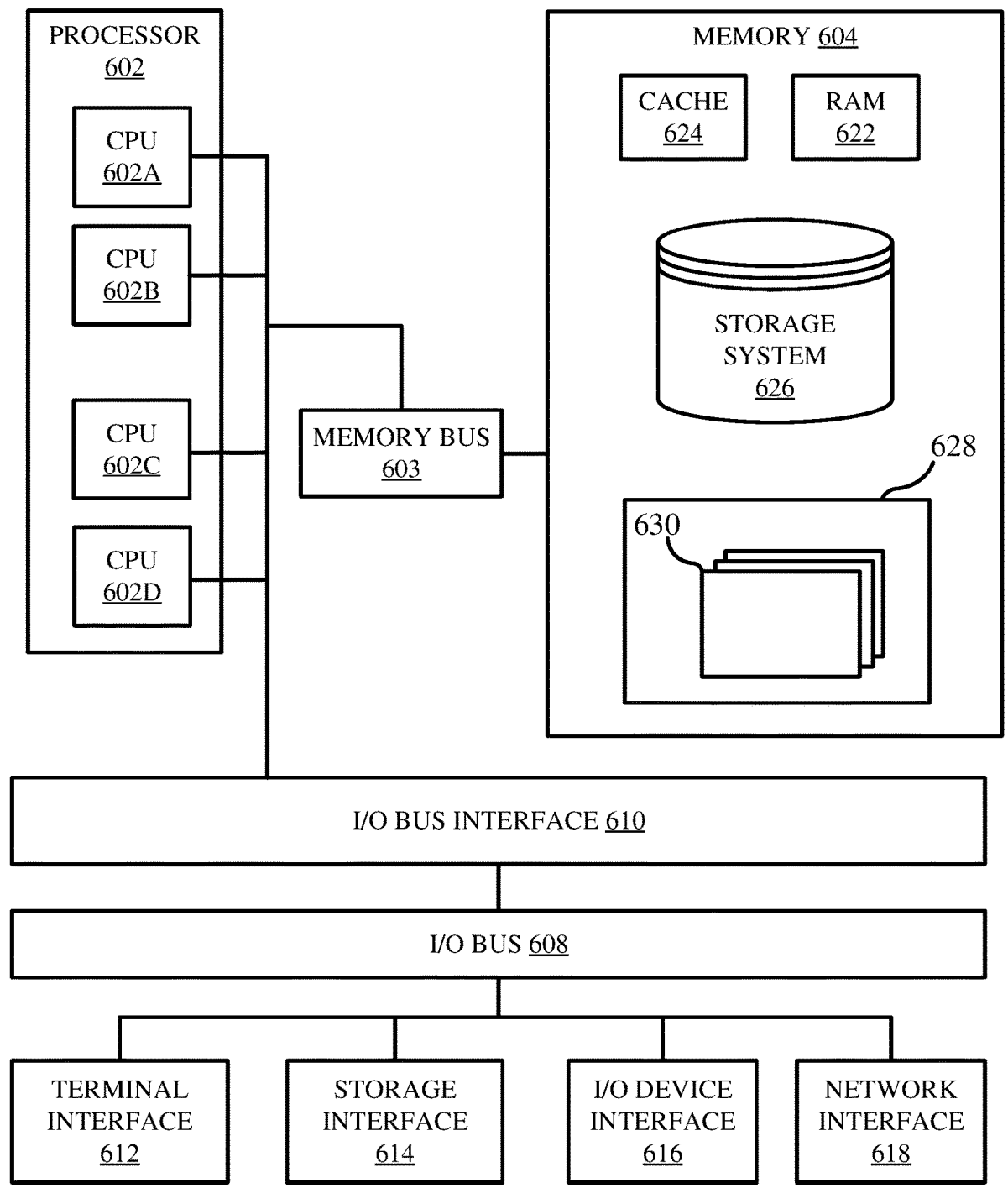
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 that may possibly be utilized in various devices discussed herein (e.g., database system 101 and client system 102*a*) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602 (also referred to as processors herein), a memory 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

Memory 604 may include computer system readable media in the form of volatile memory, such as random-access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
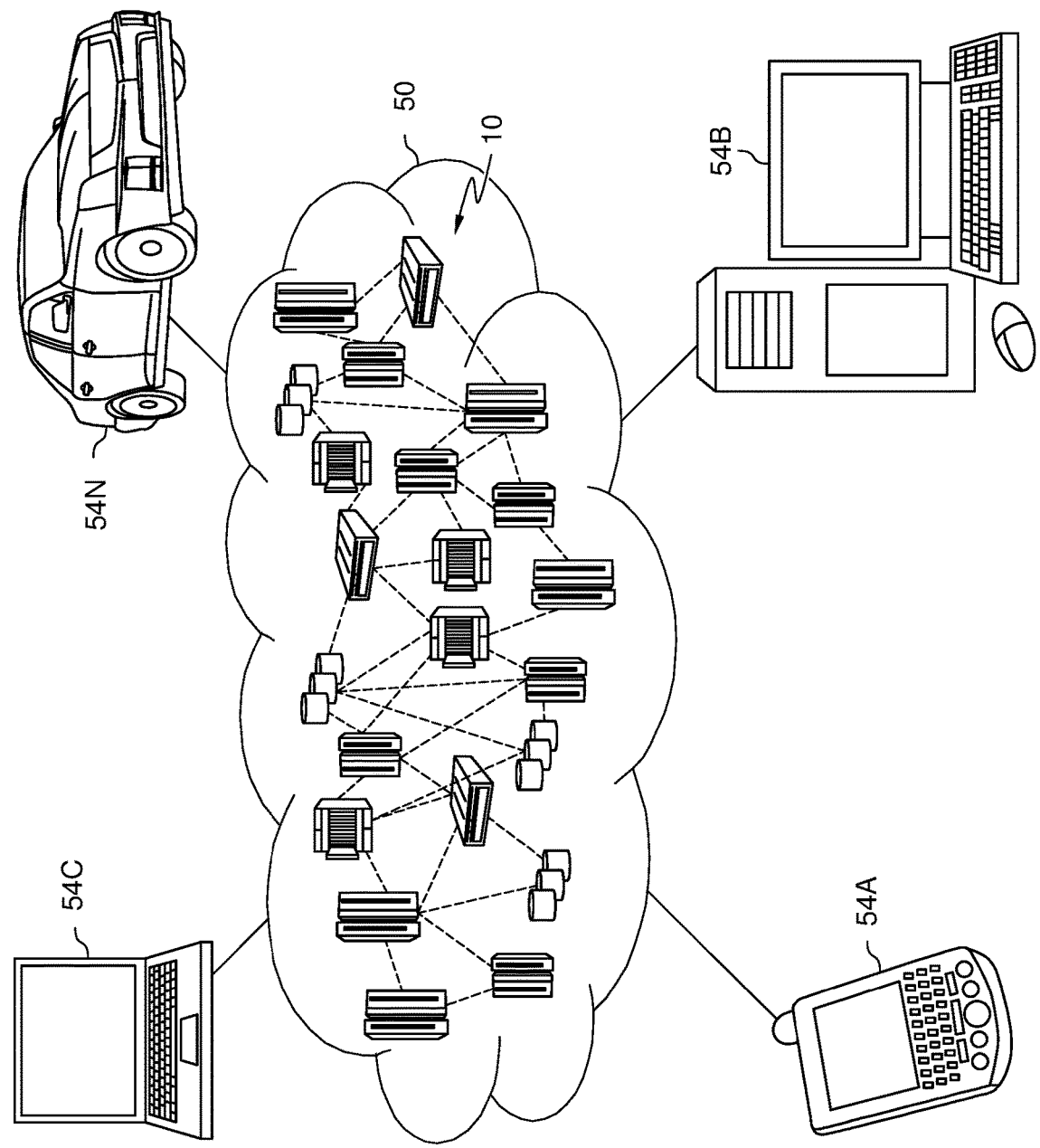
FIG. 7 depicts a cloud computing environment in accordance with embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., client system 102a), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
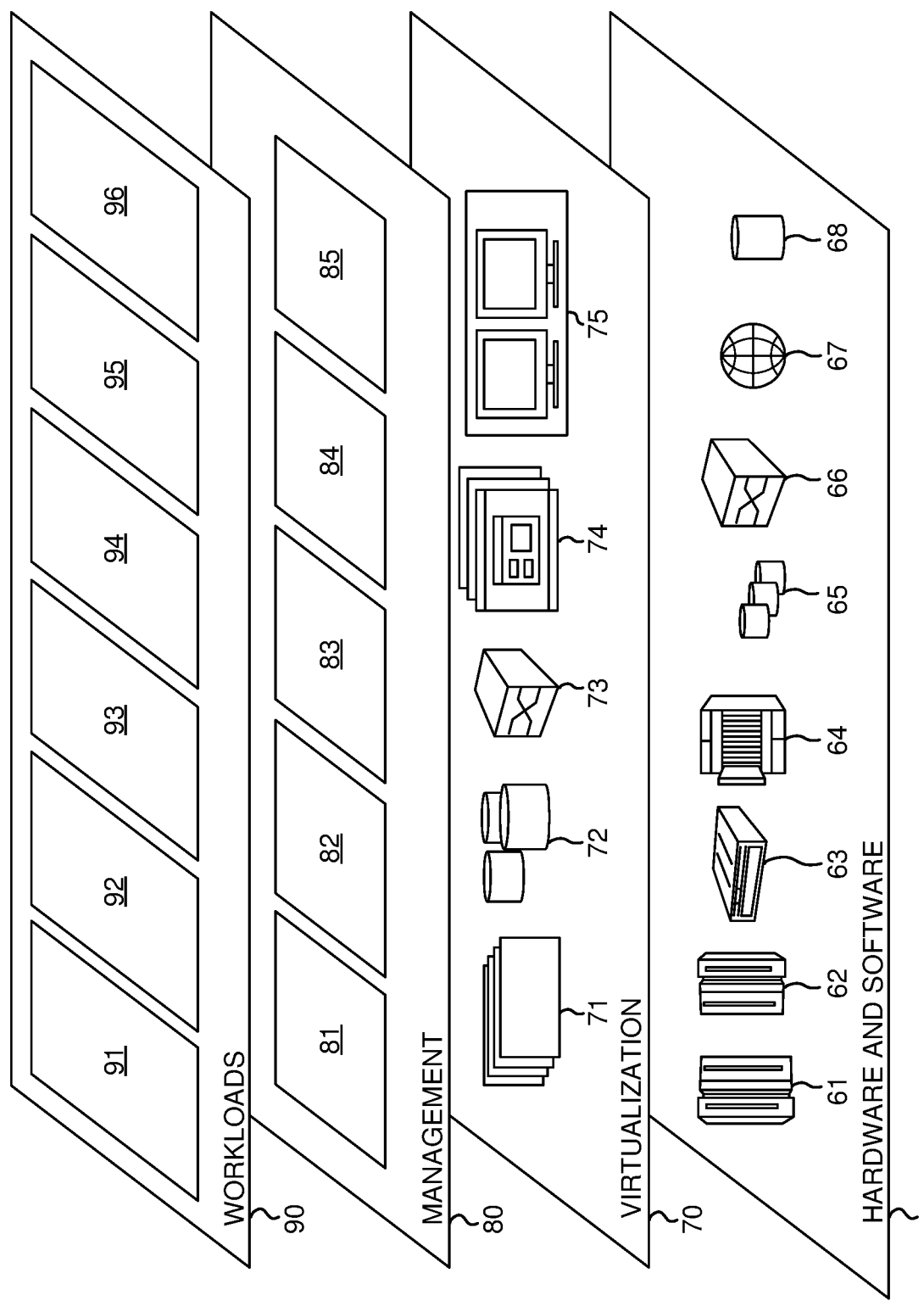
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conditional data access management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Several examples will now be provided to further clarify various aspects of the present disclosure:

Example 1: A computer implemented method for conditional access to data of a database system, the database system comprising records, each record including a set of attributes, the database system further comprising database views, each database view representing a subset of the set of attributes, the method comprising: storing data purpose objects, each data purpose object indicating a subset of attributes of the set of attributes and a processing purpose of processing said subset of attributes; associating each data processing purpose of the data processing purposes with one or more entities that authorized access to the subset of attributes of said data processing purpose; receiving a request of data for a specific processing purpose of the data processing purposes and a selected view of the database views; retrieving the data purpose object that indicates the specific processing purpose; comparing the subset of attributes represented by the selected view with the subset of the attributes indicated in the retrieved data purpose object; and providing, in response to determining that the subset of attributes represented by the selected view is a subset of the subset of the attributes indicated in the retrieved data purpose object, values of the subset of attributes represented in the selected view for entities that are associated with the specific processing purpose.

Example 2: The limitations of Example 1, wherein the data purpose object comprises a first bitmap that maps bits to the set of attributes respectively according to an order, wherein the first bitmap is configured to indicate the subset of attributes, wherein the database view comprises a second bitmap mapping bits to the set of attributes according to said order, wherein the second bitmap is configured to indicate the subset of attributes of the database view, wherein the comparing is performed using the first and second bitmaps.

Example 3: The limitations of any of Examples 1 or 2, wherein the data purpose object further comprises a public key, wherein the received request further indicates a signature, the method further comprising verifying the signature using the public key of the retrieved data purpose object, wherein the comparing is only performed if the signature is validated.

Example 4: The limitations of any of Examples 1-3, wherein associating each processing purpose of the data processing purposes with one or more entities that authorized access to the subset of attributes of said processing purpose comprises: creating a consent table, wherein each entry of the consent table comprises an entity identifier (ID) of an entity and associated processing purpose, wherein providing values of the subset of attributes comprises joining the consent table with the selected view to only include the values of the subset of attributes for the entities that are associated with the specific processing purpose.

Example 5: The limitations of any of Examples 1-4, wherein the data purpose object comprises a first list comprising the subset of attributes, wherein the database view comprises second list comprising the subset of attributes of the database view, wherein the comparing is performed using the first and second lists.

Example 6: The limitations of any of Examples 1-5, further comprising providing a procedure, the procedure being configured to receive, as input, the specific processing purpose and the selected view and to perform the retrieving, the comparing, and the providing; executing the procedure via an application programming interface (API); wherein the reception of the request is performed via a function of the API that calls the procedure.

Example 7: The limitations of any of Examples 1-6, further comprising: receiving requests from third party systems for registering the processing purposes for the third-party systems and creating the data purpose objects, wherein each data purpose object further indicates the respective third-party system.

Example 8: A system comprising one or more processor and one or more computer-readable storage media collectively storing program instructions which, when executed by the processor, are configured to cause the processor to perform a method according to any of Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7.

What is claimed is:

1. A computer implemented method for conditional access to data of a database system, the database system comprising records, each record including a set of attributes, the database system comprising database views, each database view representing a subset of the set of attributes, the method comprising:

storing data purpose objects, respective ones of data purpose objects authorizing access to only a subset of attributes of the set of attributes for a processing purpose for processing said subset of attributes;

associating respective ones of processing purposes of a plurality of processing purposes with one or more respective entities that consented to data access based on the associated processing purposes by creating a consent table, wherein respective entries of the consent table comprise an entity identifier (ID) of an entity and an associated processing purpose that the entity consented to data access for;

receiving a request for data for a specific processing purpose and a selected view of the database views;

retrieving a data purpose object for the specific processing purpose that restricts access requests for selected views based on the subset of attributes the data purpose object authorizes access to;

comparing the subset of attributes represented by the selected view with the subset of the attributes that the retrieved data purpose object authorizes access to; and providing, in response to determining that the subset of attributes represented by the requested selected view is a subset of the subset of the attributes that the retrieved data purpose object authorizes access to, values of the subset of attributes represented in the selected view by joining the consent table with the selected view to only include the values of the subset of attributes for the entities that consented to the specific processing purpose within the consent table.

2. The method of claim 1, wherein the data purpose object comprises a first bitmap that maps bits to the set of attributes respectively according to an order, wherein the first bitmap is configured to indicate the subset of attributes, wherein the database view comprises a second bitmap mapping bits to the set of attributes according to said order, wherein the second bitmap is configured to indicate the subset of attributes of the database view, wherein the comparing is performed using the first and second bitmaps.

3. The method of claim 1, wherein the data purpose object further comprises a public key, wherein the received request further includes a signature, the method further comprising:

verifying the signature using the public key of the retrieved data purpose object, wherein the comparing is only performed if the signature is validated.

4. The method of claim 1, wherein the data purpose object comprises a first list comprising the subset of attributes, wherein the database view comprises a second list comprising the subset of attributes of the database view, wherein the comparing is performed using the first and second lists.

5. The method of claim 1, further comprising:

providing a procedure, the procedure being configured to receive, as input, the specific processing purpose and the selected view and configured to perform the retrieving, the comparing, and the providing; and executing the procedure via an application programming interface (API), wherein the reception of the request is performed via a function of the API that calls the procedure.

6. A system comprising:

one or more processors; and one or more computer-readable storage media collectively storing program instructions which, when executed by the one or more processors, are configured to cause the one or more processors to perform a method for conditional access to data of a database system, the database system comprising records, each record including a set of attributes, the database system comprising database views, each database view representing a subset of the set of attributes, the method comprising:

storing data purpose objects, respective ones of data purpose objects authorizing access to only a subset of attributes of the set of attributes for a processing purpose for processing said subset of attributes;

associating respective ones of processing purposes of a plurality of processing purposes with one or more respective entities that consented to data access based on the associated processing purposes by creating a consent table, wherein respective entries of the consent table comprise an entity identifier (ID) of an entity and an associated processing purpose that the entity consented to data access for;

receiving a request for data for a specific processing purpose and a selected view of the database views;

retrieving a data purpose object for the specific processing purpose that restricts access requests for selected views based on the subset of attributes the data purpose object authorizes access to;

comparing the subset of attributes represented by the selected view with the subset of the attributes that the retrieved data purpose object authorizes access to; and providing, in response to determining that the subset of attributes represented by the requested selected view is a subset of the subset of the attributes that the retrieved data purpose object authorizes access to, values of the subset of attributes represented in the selected view by joining the consent table with the selected view to only include the values of the subset of attributes for the entities that consented to the specific processing purpose within the consent table.

7. The system of claim 6, wherein the data purpose object comprises a first bitmap that maps bits to the set of attributes respectively according to an order, wherein the first bitmap is configured to indicate the subset of attributes, wherein the database view comprises a second bitmap mapping bits to the set of attributes according to said order, wherein the second bitmap is configured to indicate the subset of attributes of the database view, wherein the comparing is performed using the first and second bitmaps.

8. The system of claim 6, wherein the data purpose object further comprises a public key, wherein the received request further includes a signature, the method further comprising:

verifying the signature using the public key of the retrieved data purpose object, wherein the comparing is only performed if the signature is validated.

9. The system of claim 6, wherein the data purpose object comprises a first list comprising the subset of attributes, wherein the database view comprises a second list comprising the subset of attributes of the database view, wherein the comparing is performed using the first and second lists.

10. The system of claim 6, wherein the method performed by the one or more processors further comprises:

providing a procedure, the procedure being configured to receive, as input, the specific processing purpose and the selected view and configured to perform the retrieving, the comparing, and the providing; and executing the procedure via an application programming interface (API), wherein the reception of the request is performed via a function of the API that calls the procedure.

11. The system of claim 6, wherein the data purpose objects are stored remotely from the database system.

12. A computer program product comprising one or more computer readable storage media, and program instructions collectively stored on the one or more computer readable storage media, the program instructions comprising instructions configured to cause one or more processors to perform a method for conditional access to data of a database system, the database system comprising records, each record including a set of attributes, the database system comprising database views, each database view representing a subset of the set of attributes, the method comprising:

storing data purpose objects, respective ones of data purpose objects authorizing access to only a subset of attributes of the set of attributes for a processing purpose for processing said subset of attributes;

associating respective ones of processing purposes of a plurality of processing purposes with one or more respective entities that consented to data access based on the associated processing purposes by creating a consent table, wherein respective entries of the consent table comprise an entity identifier (ID) of an entity and an associated processing purpose that the entity consented to data access for;

receiving a request for data for a specific processing purpose and a selected view of the database views;

retrieving a data purpose object for the specific processing purpose that restricts access requests for selected views based on the subset of attributes the data purpose object authorizes access to;

comparing the subset of attributes represented by the selected view with the subset of the attributes that the retrieved data purpose object authorizes access to; and providing, in response to determining that the subset of attributes represented by the requested selected view is a subset of the subset of the attributes that the retrieved data purpose object authorizes access to, values of the subset of attributes represented in the selected view by joining the consent table with the selected view to only include the values of the subset of attributes for the entities that consented to the specific processing purpose within the consent table.

13. The computer program product of claim 12, wherein the data purpose object comprises a first bitmap that maps bits to the set of attributes respectively according to an order, wherein the first bitmap is configured to indicate the subset of attributes, wherein the database view comprises a second bitmap mapping bits to the set of attributes according to said order, wherein the second bitmap is configured to indicate the subset of attributes of the database view, wherein the comparing is performed using the first and second bitmaps.

14. The computer program product of claim 12, wherein the data purpose object further comprises a public key, wherein the received request further includes a signature, the method further comprising:

verifying the signature using the public key of the retrieved data purpose object, wherein the comparing is only performed if the signature is validated.

15. The computer program product of claim 12, wherein the data purpose object comprises a first list comprising the subset of attributes, wherein the database view comprises a second list comprising the subset of attributes of the database view, wherein the comparing is performed using the first and second lists.

16. The computer program product of claim 12, wherein the method performed by the one or more processors further comprises:

providing a procedure, the procedure being configured to receive, as input, the specific processing purpose and the selected view and configured to perform the retrieving, the comparing, and the providing; and executing the procedure via an application programming interface (API), wherein the reception of the request is performed via a function of the API that calls the procedure.

17. The computer program product of claim 12, wherein the data purpose objects are stored remotely from the database system.

* * * * *